(12) United States Patent
Rose et al.

(10) Patent No.: US 8,793,497 B2
(45) Date of Patent: Jul. 29, 2014

(54) PUZZLE-BASED AUTHENTICATION BETWEEN A TOKEN AND VERIFIERS

(75) Inventors: Gregory Gordon Rose, San Diego, CA (US); Alexander Gantman, Poway, CA (US); Miriam Wiggers De Vries, Crows Nest (AU); Michael Paddon, Tokyo (JP); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 12/118,593

(22) Filed: May 9, 2008

(65) Prior Publication Data

US 2009/0282243 A1 Nov. 12, 2009

(51) Int. Cl.
*G06F 21/00* (2013.01)
(52) U.S. Cl.
USPC .................. 713/172; 713/185; 726/3; 726/22
(58) Field of Classification Search
USPC ................................. 713/172, 185; 726/3, 22
See application file for complete search history.

(56) References Cited

U.S. PATENT DOCUMENTS

| 6,944,765 | B1 | 9/2005 | Rose et al. | |
|---|---|---|---|---|
| 2003/0217269 | A1* | 11/2003 | Gantman et al. | 713/172 |
| 2004/0139152 | A1* | 7/2004 | Kaler et al. | 709/203 |
| 2006/0046690 | A1* | 3/2006 | Rose et al. | 455/410 |
| 2007/0255060 | A1 | 11/2007 | Okada et al. | |
| 2007/0255960 | A1* | 11/2007 | Hon et al. | 713/185 |
| 2009/0007265 | A1* | 1/2009 | Torre et al. | 726/22 |
| 2010/0031315 | A1* | 2/2010 | Feng et al. | 726/3 |

FOREIGN PATENT DOCUMENTS

| GB | 2382281 | | 5/2003 |
|---|---|---|---|
| JP | 2001352323 | A | 12/2001 |
| JP | 2007195155 | A | 8/2007 |
| JP | 2010506480 | A | 2/2010 |
| WO | 2008041052 | A1 | 4/2008 |

OTHER PUBLICATIONS

Suarez, "Survey of Attacks and Defences on P2PSIP Communications", 2012, IEEE, p. 750-783.*
Brent Waters, Ari Juels, J. Alex Halderman, and Edward W. Felten: "New Client Puzzle Outsourcing Techniques for DoS Resistance" CCS '04, Oct. 29, 2004, pp. 1-11, XP002538930 Washington, DC, USA, abstract, paragraph [01.2], paragraph [02.1].

(Continued)

*Primary Examiner* — Mahfuzur Rahman
*Assistant Examiner* — Gregory Lane
(74) *Attorney, Agent, or Firm* — Won Tae Kim

(57) ABSTRACT

A puzzle-based protocol is provided that allows a token and verifier to agree on a secure symmetric key for authentication between the token and verifier. A token stores a secret key and one or more puzzle-generating algorithms. The verifier independently obtains a plurality of puzzles associated with the token, pseudorandomly selects at least one of the puzzles, and solves it to obtain a puzzle secret and a puzzle identifier. The verifier generates a verifier key based on the puzzle secret. The verifier sends the puzzle identifier and an encoded version of the verifier key to the token. The token regenerates the puzzle secret using its puzzle-generating algorithms and the puzzle identifier. The token sends an encoded response to the verifier indicating that it knows the verifier key. The token and verifier may use the verifier key as a symmetric key for subsequent authentications.

54 Claims, 9 Drawing Sheets

(56) References Cited

OTHER PUBLICATIONS

International Search Report—PCT/US2009/043040—International Search Authority, European Patent Office, Jun. 8, 2009.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].
Written Opinion—PCT/US2009/043040, International Search Authority, European Patent Office, May 6, 2009.
Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.
Rivest Ronald L. et al, "Time-lock puzzles and timed-release crypto", [online], 1996, URL: http://citeseer.ist.psu.edu/viewdoc/summary?doi=10.1.1.110.5709.
Taiwan Search Report—TW098115363—TIPO—Feb. 27, 2013.

\* cited by examiner

PUZZLE-BASED AUTHENTICATION BETWEEN A TOKEN AND VERIFIERS

BACKGROUND

1. Field

The present invention relates to secure authentication and more particularly to authentication of limited resource devices.

2. Background

Electronic authentication typically involves some form of digital signature or message authentication code based on public-key (asymmetric-key) or symmetric-key cryptographic methods, respectively. Public-key and symmetric-key methods have different characteristics, making them applicable in different situations. Generally speaking, public-key systems have great advantages in terms of key management and distribution, but are computationally difficult and the digital signatures generated tend to be large. Symmetric-key methods, while very efficient and producing small outputs, have the drawback that they cannot be securely used with multiple verifying parties simultaneously.

Most small authentication tokens have been forced, by both limited computational resources and the need for small outputs, to use symmetric-key cryptography. In turn, this means that the token can only be used for authentication with only one verifying party. For example, two different entities may issue compatible tokens with different symmetric keys, but they cannot be combined into one token because that would necessitate sharing the symmetric key and the parties may not trust each other. With a recent announcement that U.S. banks will implement two-factor authentication methods, users may have to carry around multiple authentication tokens everywhere they go.

Authentication methods based on public-key systems have been proposed, but one drawback is that they demand greater computational resources than is available on many tokens. That is, tokens tend to be inexpensive and/or have limited processing resources. Adding more powerful processors to such tokens not only increases costs but also leads to having shorter battery lifetimes. Another drawback of using a public-key system is that the longer size of digital signatures makes it cumbersome to implement in comparison to typing or reading out a short sequence of digits.

Another type of authentication system uses trusted third parties to mediate the authentication. An example of such a system is MIT's Kerberos. However, reliance on a trusted third party is a deal-breaker for many institutions, such as banks, since it adds another point where security may be compromised.

Therefore, there is a need for a way to combine the advantages of public-key and symmetric-key systems to provide small and efficient digital signatures so that a single token can be used with multiple verifiers.

SUMMARY

A method is provided operational on a verifier for authenticating a token. An authentication request and token identifier are received from a token. A helper address may be obtained for the helper associated with the token. A plurality of puzzles corresponding to the token is received from a networked helper. A puzzle may be an encoded message including a puzzle identifier and a puzzle secret. One of the puzzles is pseudorandomly selected and solved to obtain a puzzle secret and a corresponding puzzle identifier. For instance, the selected puzzle may be solved by performing a brute force attack to find a key with which to decode the puzzle. A verifier key is generated based on the puzzle secret. A challenge message is then generated based on the verifier key. The puzzle identifier and challenge message are sent to the token. A response message may be received from the token proving that the token has knowledge of the verifier key, wherein the verifier authenticates the token if the response message successfully proves that the token knows the verifier key. The verifier key may be stored and associated with the token identifier for use as a symmetric key in subsequent authentications between the token and the verifier.

In one example, a subset plurality of the received puzzles may be pseudorandomly selected and solved to obtain a plurality of puzzle secrets and corresponding puzzle identifiers. The verifier key may be based on an ordered set of the puzzle secrets. The ordered set of the puzzle identifiers corresponding to the ordered set of puzzle secrets is sent to the token along with the challenge message.

According to another feature, the verifier may generate a pseudorandom nonce and send it to the helper to be used in obtaining the plurality of puzzles from among a larger number of puzzles corresponding to the token.

In one implementation, a local counter may be synchronized with a counter maintained by the token to track each time authentication is performed between the token and the verifier, wherein subsequent authentication challenge messages are also based on a current counter value. Consequently, a response message may be received from the token proving that the token has knowledge of the verifier key and the current counter value. The verifier authenticates the token if the response message successfully proves that it knows the verifier key and current counter value.

In another implementation, a timer may be maintained that generates timestamps, wherein subsequent authentication challenge messages are also based on a current timestamp. A response message may be received from the token proving that the token has knowledge of the verifier key and the current timestamp. The verifier authenticates the token if the response message successfully proves that it knows the verifier key the current timestamp.

A verifier device for authenticating tokens, comprising: a first and second communication interfaces coupled to a processing circuit. The first communication interface having high bandwidth to a network. The second communication interface having low bandwidth for communicating with tokens. The processing circuit configured to (a) receive an authentication request and token identifier from a token over the second communication interface; (b) obtain a helper address for the helper associated with the token; (c) obtain a plurality of puzzles corresponding to the token from the helper over the first communication interface; (d) pseudorandomly select one of the puzzles and solving it to obtain a puzzle secret and a corresponding puzzle identifier; (e) generate a verifier key based on the puzzle secret; (f) generate a challenge message based on the verifier key; (g) send the puzzle identifier and challenge message to the token via the second communication interface; and/or (h) receive a response message from the token proving that the token has knowledge of the verifier key. The verifier device authenticates the token if the response message successfully proves that the token knows the verifier key.

The verifier device may also include a storage device coupled to the processing circuit for storing the verifier key. The processing circuit may be further configured to associate the verifier key with the token identifier for use as a symmetric key in subsequent authentications between the token and the verifier.

In some implementations, the processing circuit may be further configured to (a) pseudorandomly select a subset plurality of the received puzzles and solve them to obtain a plurality of puzzle secrets and corresponding puzzle identifiers (wherein the verifier key may also be based on an ordered set of the puzzle secrets); and (b) send an ordered set of the puzzle identifiers corresponding to the ordered set of puzzle secrets to the token along with the challenge message.

In one implementation, a local counter may be synchronized with a counter maintained by the token to track each time authentication is performed between the token and the verifier. Subsequent authentication challenge messages may also be based on a current counter value. Consequently, a response message may be received from the token proving that the token has knowledge of the verifier key and the current counter value. The verifier authenticates the token if the response message successfully proves that it independently knows the verifier key and current counter value.

In another implementation, a timer is maintained to that generates timestamps/Subsequent authentication challenge messages may also be based on a current timestamp. Consequently, a response message may be received from the token proving that the token has knowledge of the verifier key and the current timestamp. The verifier authenticates the token if the response message successfully proves that it independently knows the verifier key and the current timestamp.

Consequently, a verifier device for authenticating tokens is provided, comprising: (a) means for receiving an authentication request and token identifier from a token; (b) means for obtaining a helper address for the helper associated with the token; (c) means for obtaining a plurality of puzzles corresponding to the token from the networked helper; (d) means for pseudorandomly selecting one of the puzzles and solving it to obtain a puzzle secret and a corresponding puzzle identifier; (e) means for generating a verifier key based on the puzzle secret; (f) means for generating a challenge message based on the verifier key; (g) means for sending the puzzle identifier and challenge message to the token; and/or (h) means for receiving a response message from the token proving that the token has knowledge of the verifier key, wherein the verifier authenticates the token if the response message successfully proves that the token knows the verifier key. Additionally, verifier device may also include (i) means for storing the verifier key; (j) means for associating the verifier key with the token identifier for use as a symmetric key in subsequent authentications between the token and the verifier; (k) means for pseudorandomly selecting a subset plurality of the received puzzles and solving them to obtain a plurality of puzzle secrets and corresponding puzzle identifiers (wherein the verifier key is also based on an ordered set of the puzzle secrets); and/or (l) means for sending an ordered set of the puzzle identifiers corresponding to the ordered set of puzzle secrets to the token along with the challenge message.

A processing device is also provided comprising a processing circuit configured to (a) receive an authentication request and token identifier from a token over a first communication interface; (b) obtain a plurality of puzzles corresponding to the token from a helper over a second communication interface; (c) pseudorandomly select one of the puzzles and solving it to obtain a puzzle secret and a corresponding puzzle identifier; (d) generate a verifier key based on the puzzle secret; (e) generate a challenge message based on the verifier key; (f) send the puzzle identifier and challenge message to the token via the first communication interface; and/or (g) associate the verifier key with the token identifier for use as a symmetric key in subsequent authentications between the token and the verifier.

A machine-readable medium having one or more instructions for authenticating a token to a verifier is also provided, which when executed by a processor causes the processor to: (a) obtain a plurality of puzzles corresponding to the token from a networked helper; (b) pseudorandomly select one of the puzzles and solving it to obtain a puzzle secret and a corresponding puzzle identifier; (c) generate a verifier key based on the puzzle secret; (d) generate a challenge message based on the verifier key; (e) send the puzzle identifier and challenge message to the token; (f) receive a response message from the token proving that the token has knowledge of the verifier key (wherein the verifier authenticates the token if the response message successfully proves that the token knows the verifier key); and/or (g) associate the verifier key with the token identifier for use as a symmetric key in subsequent authentications between the token and the verifier.

A method operational on a token is also provided for authenticating the token to a verifier. A token is provisioned with a secret key, a token identifier, and one or more puzzle-generating algorithms. Authentication of the token is initiated by providing the token identifier to a verifier. A challenge message is received from the verifier including one or more puzzle identifiers and a message authentication code based on a first verifier key. The first verifier key may be a function of one or more puzzle secrets associated with one or more puzzles identified by the one or more puzzle identifiers. The token independently obtains the one or more puzzle secrets based on the one or more puzzle-generating algorithms, the received one or more puzzle identifiers, and the secret key. A second verifier key is generated by the token based on the one or more puzzle secrets. The received message authentication code is verified by the token to determine whether the first verifier key and second verifier key are the same. The second verifier key is stored and associated with the verifier if the first and second verifier keys are the same. The token may generate a response message to the verifier based on the second verifier key indicating that the token knows the first verifier key. A helper address may be provided by the token to the verifier for a helper that stores a plurality of puzzles associated with the token. The token may receive a plurality of ordered puzzle identifiers from the verifier, wherein the first verifier key is a function of a corresponding plurality of ordered puzzle secrets associated with the plurality of ordered puzzle identifiers. The plurality of ordered puzzle secrets may be obtained based on the one or more puzzle-generating algorithms, the received puzzle identifiers, and the secret key. The first and second verifier keys may also be based on the plurality of ordered puzzle secrets. In this manner, a plurality of secure verifier keys may be established with different verifiers. Each of the verifier keys may be associated with a corresponding verifier for use as symmetric key authentications between the token and the different verifiers.

In one implementation, a local counter may be synchronized with a counter maintained by the verifier to track each time authentication is performed between the token and the verifier. Subsequent received message authentication codes may also be based on a current counter value. A response message may be sent to the verifier proving that the token has knowledge of the verifier key and the current counter value.

In another implementation, a timer is maintained to generate timestamps. Consequently, subsequent received message authentication codes may also be based on a current timestamp. A response message may be sent to the verifier proving that the token has knowledge of the verifier key and the current timestamp.

A token is provided, comprising: a first communication interface and a processing circuit. The first communication interface having low bandwidth for communicating with verifiers. The processing circuit configured to (a) receive a secret key, a token identifier, and one or more puzzle-generating algorithms; (b) initiate authentication of the token by providing the token identifier to a verifier; (c) receive a challenge message from the verifier including a puzzle identifier and a message authentication code based on a first verifier key (the first verifier key being a function of a first puzzle secret associated with a puzzle identified by the puzzle identifier); (d) independently obtain the first puzzle secret based on the one or more puzzle-generating algorithms, the received puzzle identifier, and the secret key; (e) generate a second verifier key based on the puzzle secret; and/or (f) verify the received message authentication code to determine whether the first verifier key and second verifier key are the same. The processing circuit may associate the second verifier key with the verifier if the first and second verifier keys are the same. A response message may be generated to the verifier based on the second verifier key indicating that the token knows the first verifier key.

Consequently, a token is provided for authenticating with verifiers, comprising: (a) means for provisioning a token with a secret key, a token identifier, and one or more puzzle-generating algorithms; (b) means for initiating authentication of the token by providing the token identifier to a verifier; (c) means for receiving a challenge message from the verifier including a puzzle identifier and a message authentication code based on a first verifier key (wherein the first verifier key is a function of a first puzzle secret associated with a puzzle identified by the puzzle identifier); (d) means for independently obtaining the first puzzle secret based on the one or more puzzle-generating algorithms, the received puzzle identifier, and the secret key; (e) means for generating a second verifier key based on the puzzle secret; (f) means for verifying the received message authentication code to determine whether the first verifier key and second verifier key are the same; (g) means for storing the second verifier key and associating it with the verifier if the first and second verifier keys are the same; and/or (h) means for providing a helper address from the token to the verifier for a helper that stores a plurality of puzzles associated with the token.

A processing device is also provided, comprising a processing circuit configured to (a) receive a secret key, a token identifier, and one or more puzzle-generating algorithms; (b) initiate authentication of the token by providing the token identifier to a verifier; (c) receive a challenge message from the verifier including a puzzle identifier and a message authentication code based on a first verifier key (wherein the first verifier key is a function of a first puzzle secret associated with a puzzle identified by the puzzle identifier); (d) independently obtain the first puzzle secret based on the one or more puzzle-generating algorithms, the received puzzle identifier, and the secret key; (e) generate a second verifier key based on the puzzle secret; (f) verify the received message authentication code to determine whether the first verifier key and second verifier key are the same; and/or (g) generate a response message to the verifier based on the second verifier key indicating that the token knows the first verifier key.

A machine-readable medium is provide having one or more instructions for authenticating a token to a verifier, which when executed by a processor causes the processor to: (a) provision a token with a secret key, a token identifier, and one or more puzzle-generating algorithms; (b) initiate authentication of the token by providing the token identifier to a verifier; (c) receive a challenge message from the verifier including a puzzle identifier and a message authentication code based on a first verifier key (wherein the first verifier key is a function of a first puzzle secret associated with a puzzle identified by the puzzle identifier); (d) independently obtain the first puzzle secret based on the one or more puzzle-generating algorithms, the received puzzle identifier, and the secret key; (e) generate a second verifier key based on the puzzle secret; (f) verify the received message authentication code to determine whether the first verifier key and second verifier key are the same; and/or (g) store the second verifier key and associate it with the verifier if the first and second verifier keys are the same.

DETAILED DESCRIPTION

Figure 1:
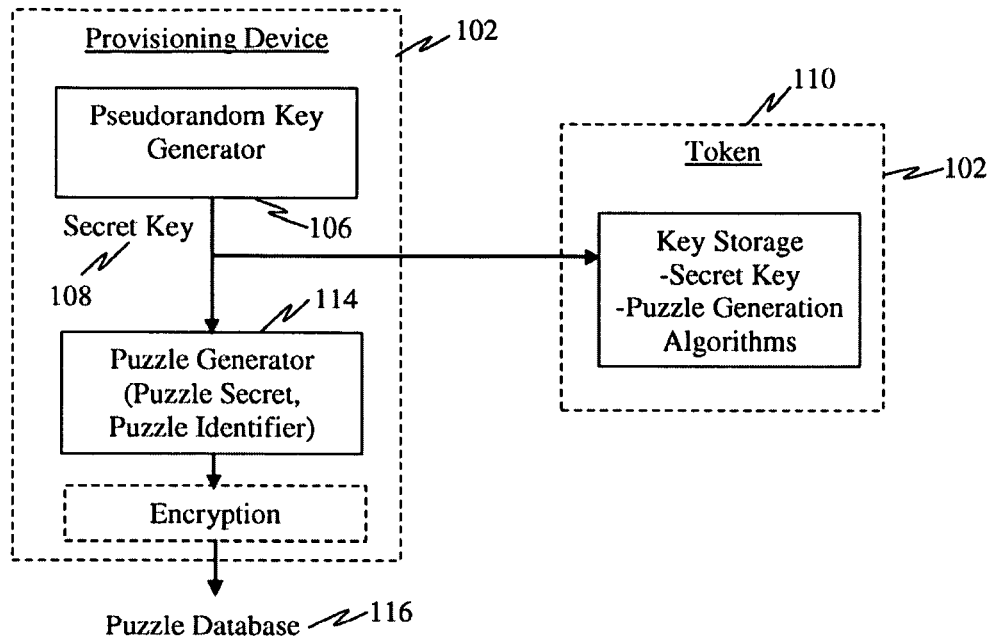
FIG. 1 is a block diagram illustrating how a token may be provisioned with a secret key and puzzles associated with the token may be generated in one example.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

The term "token" refers to a physical device with limited processing and/or communication resources that is associated with an authorized user to aid in authentication. The term "verifier" refers to a device, entity, and/or virtual object (e.g., software application, etc.) that performs authentication of a token. The term "helper" refers to a device, entity, and/or virtual object (e.g., software application, etc.) that assists the verifier in authenticating the token.

One aspect provides a networked helper that facilitates setting up a symmetric key for authentication between a token and a verifier. The verifier utilizes the helper to assist the verifier in obtaining the symmetric key but the helper cannot itself obtain the symmetric key. The method may involve three stages: provisioning, initial authentication, and subsequent authentication.

Another aspect provides a puzzle-based protocol that allows a token and verifier to agree on a secure symmetric key for authentication between the token and verifier.

In a provisioning stage, a small, low-powered, and portable token having a low bandwidth interface is provided with a secret key that can be used to authenticate an associated user with multiple different verifiers. The provisioning stage may also involve generating a plurality of puzzles associated with the secret key assigned to the token and distributing the puzzles to a third party helper.

In the initial authentication stage, the token is introduced to verifiers by enabling the token and the verifier to negotiate a shared symmetric key. The verifier receives a token identifier that it can use to obtain a random plurality of puzzles, associated with the token, from the helper. The verifier then solves or deciphers at least one of the puzzles by brute force to obtain an associated puzzle secret and a puzzle identifier. The verifier generates a verifier key, at least partially based on the puzzle secret and other information obtained from the solved puzzle. The verifier provides the puzzle identifier and a message authentication code of the verifier key to the token. The token uses the received puzzle identifier to retrieve the associated puzzle secrets and generate a local version of the verifier key. The token can then generate a local version of the message authentication code (based at least partially on the puzzle identifier and local verifier key) and determine whether it matches the received message authentication code. If the local and received message authentication codes match, the verifier key may be used as a symmetric key between the token and verifier.

Thereafter, in the subsequent authentication stage, a shorter and entirely symmetric-key based process can be used to re-authenticate. For instance, the previously generated verifier key (obtained during the initial authentication stage) may be used by the token and verifier for authentication. In this manner, the token, verifier, and helper combine symmetric-key and public-key methods and split the implementation of a public-key digital signature between the verifier and the helper. The helper performs some of the functions of a trusted third party, but it does not know the secret symmetric key and compromising the helper does not allow spoofing of authentication. This authentication system provides most of the functionality of a full public-key based system, but the actual token uses only a small amount of processing resources and bandwidth after provisioning.

Provisioning Key and Generating Puzzle Database

FIG. 1 is a block diagram illustrating how a token may be provisioned with a secret key and puzzles associated with the token may be generated in one example. A provisioning device 102 may be operated by a manufacturer or distributor to configure tokens. The provisioning device 102 includes a pseudorandom key generator 106 that generates secret keys. During manufacturing, setup, or initialization of a token 110, the provisioning device 102 may generate and distribute a secret key 108 to the token 110 where it is stored in a key storage device 112 (e.g., memory). The token 110 may also store one or more puzzle generation algorithms that it can use to regenerate puzzles using its secret key. Additionally, the secret key 108 is used to seed a puzzle generator 114. The puzzle generator 114 is configured to use the secret key 108 to generate a plurality of puzzles (e.g., messages) and provide such puzzles to a puzzle database 116 (such as a third party helper). In one example, each puzzle may include a puzzle secret a unique puzzle identifier. The puzzle may be encrypted prior storing it in the puzzle database 116. The secret key 108 may be destroyed by the provisioning device 102 so that it cannot be used to compromise the token 110.

In an alternative implementation, the provisioning device 102 may not generate the secret key. Instead, the token 110 is provisioned with the secret key beforehand by other means and is coupled to the provisioning device long enough to temporarily provide the secret key with which to generate the plurality of puzzles associated with the token.

Figure 2:
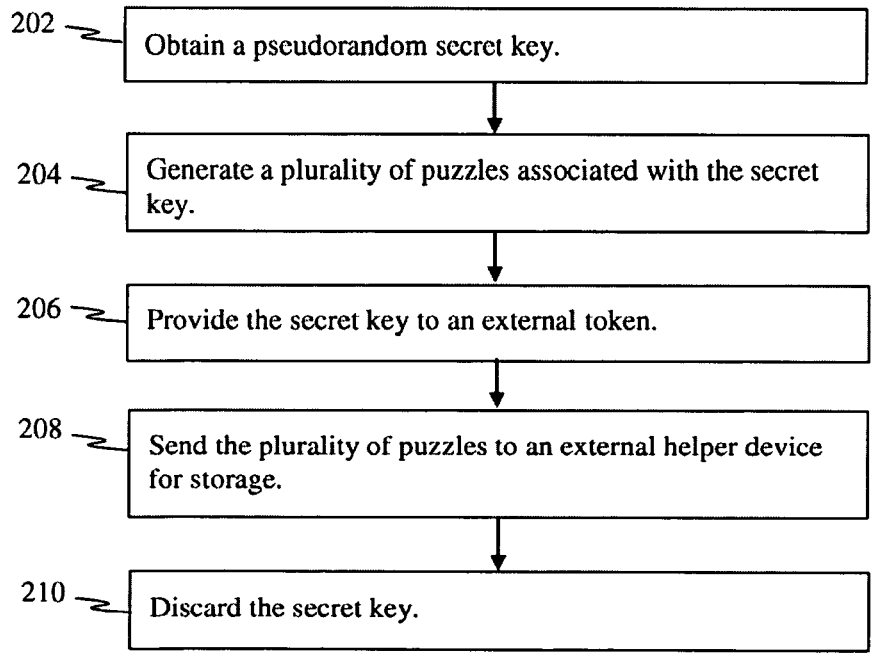
FIG. 2 illustrates a method operational on a provisioning device to generate and distribute a secret key to a token and generate a plurality of puzzles associated with the secret key according to one example.

FIG. 2 illustrates a method operational on a provisioning device to generate and distribute a secret key to a token and generate a plurality of puzzles associated with the secret key according to one example. A pseudorandom secret key is obtained 202. The secret key may be either provided by the token or generated by the provisioning device. For example, a pseudorandom generator (PRG), which accepts as inputs a private key and a nonce, may be used to generate the pseudorandom secret key as an arbitrarily long string of random-looking bits. A secure stream cipher, such as non-linear SOBER (NLS), may be used to instantiate the PRG, although there are many alternatives.

A plurality of puzzles (e.g., encrypted messages) associated with the secret key are generated 204. The secret key is provided to an external token device 206. The plurality of puzzles is also sent to an external helper device 208 where they are stored. The secret key is then discarded 210 by the provisioning device.

The number of puzzles generated and provided to the helper may be very large (e.g., thousands, millions, etc.). The provisioning device 102 may generate these puzzles algorithmically based on the secret key provided to the token 110. Therefore, the token itself need not store all the puzzles since it can reproduce a particular puzzle on demand. However the helper is not given the secret key and, therefore, needs to store all of the puzzles associated with a token. There are at least two distinct ways that this might come about.

After the puzzle database 116 is created it is communicated to the helper. In some implementations, the provisioner and the helper may be the same device. In an alternative implementation, a storage medium (e.g., disk) containing the puzzle database may be distributed with the associated token. The end user may then choose an appropriate helper and distribute the puzzle database (from the storage medium) to that helper. The helper may be told the identity of the user and/or a token identifier (corresponding to a received puzzle database) so that it is able identify which puzzles to send when a request for puzzles is received from a verifier.

In various applications, a plurality of helpers may receive the puzzle database for a token, thereby providing redundancy and scaling. A helper may store puzzle databases for a plurality of different tokens.

Puzzle Generation

By creating a large number of puzzles, each of a moderate amount of difficulty, it makes it possible for the verifier to solve the puzzle with a moderate amount of computing effort. A puzzle may be in the form of a message encoded with an unknown puzzle key (PK) that is short enough to allow a brute force attack by the verifier.

Puzzles may be generated in a random order. Each puzzle may include a puzzle identifier field (PID), a puzzle secret key (PS), and a puzzle message authentication code (PM) field. The puzzle identifier (PID) may be randomly generated within the range of the possible number of puzzles. In one example, the PID may be 32 bits. The puzzle secret (PS) may be a full strength cryptographic key (e.g., 128 bits). In one example, the PS may be computed (in the token 302 or provisioning device 102) by a puzzle generation function or algorithm (PGF) based on the token secret key (SK) and/or the puzzle identifier (PID) (i.e., PGF(SK, PID)). The puzzle message authentication code (PM) may be defined as the message authentication code of PS and PID (i.e., PM(PS, PID)), allows the verifier to know when it has successfully "cracked" or decrypted a puzzle. That is, the verifier would know if the puzzle is successfully decrypted by identifying the PID or some other flag, marker, or bit sequence that indicates that the puzzle has been successfully solved.

Prior to distribution to a helper, the puzzles may be encrypted using a unique, limited-strength Puzzle Key (PK), generated at random either by the token or the provisioning device. The strength of this encryption, and how many puzzles to generate, depends on just how likely it is that the helper puzzle database will be compromised. If hacking or unauthorized access is deemed unlikely, then the puzzle encryption can be nothing at all, and fewer puzzles may be used per potential verifier.

Using the puzzle system gives some extra security in the event that the helper is compromised. Such security may be based on the complexity and number of puzzles used for a particular token. For instance, a large number of easily decipherable puzzles may be used for a particular token, where the security is provided by the puzzle, or combination of puzzles, selected by the verifier. Once the verifier breaks or solves one or more pseudorandomly selected puzzles (from a large number of puzzles received from the helper) it can obtain the PID and PS for each selected puzzle. The verifier can generate the session key or verifier key (VK) based on the puzzle secrets (PS) that correspond to the PID(s) sent to the token. Having received the PID from the verifier, the token can also generate the session key or verifier key (VK). Thus, both the verifier and token can securely agree on a common symmetric key. An eavesdropper or compromised helper has a harder task in determining the session key or verifier key (VK) since it does not know which puzzle(s) was solved by the verifier. At best, the eavesdropper or helper may seek to solve all the puzzles associated with a particular token, but since there are so many (e.g., millions), this is a great deal more computationally costly.

Initial Authentication Stage

Once a token is provisioned with a secret key and a helper device has obtained the associated puzzles, authentication may be performed between a token and verifier device with the assistance of a helper device. The process for initially authenticating between the token and a particular verifier is computationally intensive for the verifier, perhaps more so than a traditional public key system. Therefore, in one implementation the initial authentication stage may used to "introduce" the token to verifiers, enabling the token and the verifier to negotiate a shared symmetric key. Thereafter, a shorter and entirely symmetric-key based process may be used for subsequent authentications (re-authentication).

Figure 3:
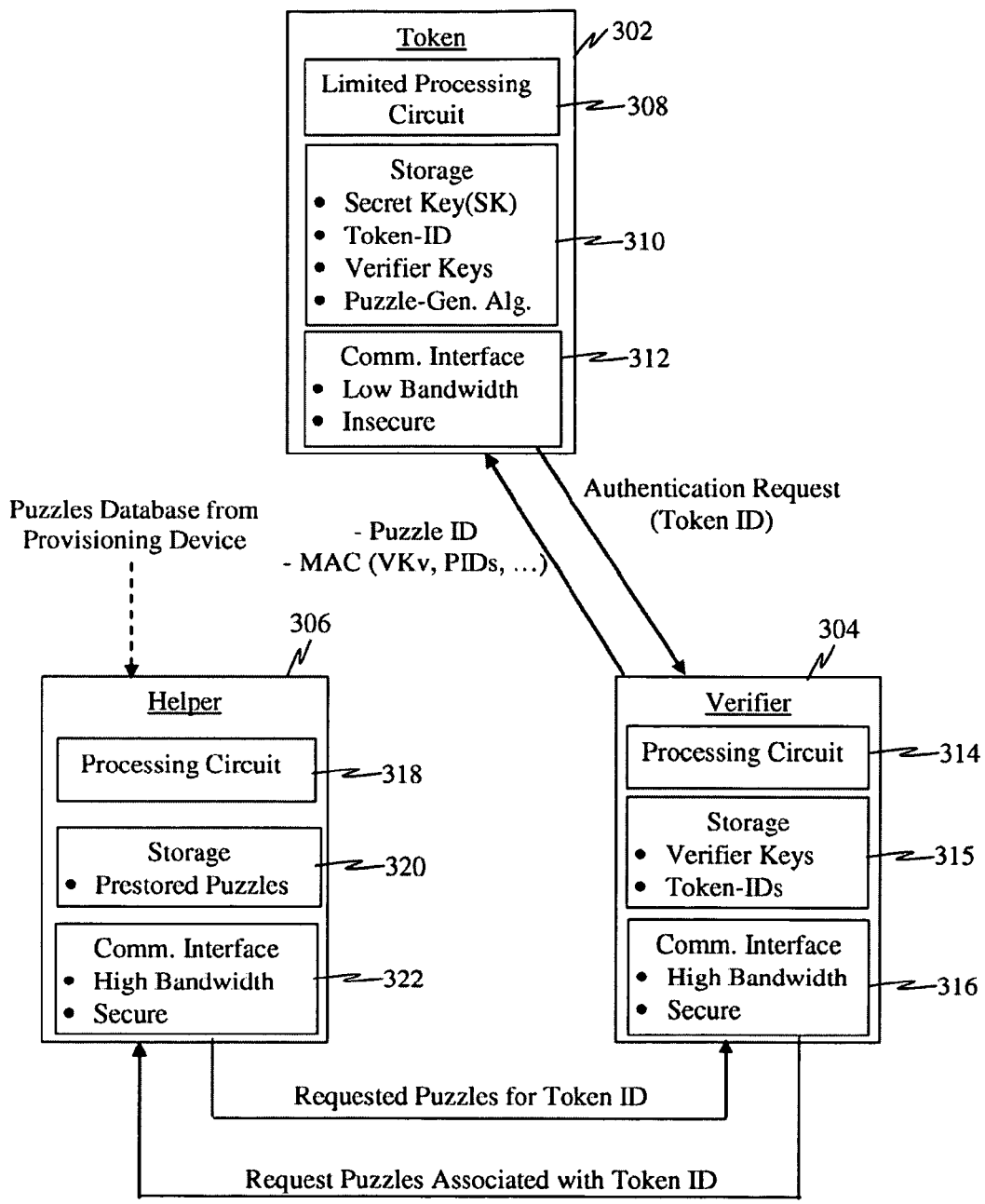
FIG. 3 illustrates how a token, a verifier device, and a helper device may operate during an initial authentication of the token.

FIG. 3 illustrates how a token 302, a verifier device 304 and a helper device 306 may operate during an initial authentication of the token 302. The token 302 may be a device including a limited processing circuit 308, a storage device 310 to store the secret key (SK), Token-ID, verifier keys VK, and puzzle-generation algorithm or function, and a low bandwidth, insecure communication interface 312. The low bandwidth interface may be as simple as a numeric keypad and an 8-digit display, ranging through things like USB, Bluetooth, Near-Field Communication and Cellular/LDC.

The verifier 304 may be a device, entity, and/or virtual object including a processing circuit 314 having significantly more processing resources than the token, a storage device 315 for storing verifier keys and associated Token-IDs, and a high-bandwidth, secure communication interface 316. The helper 306 may be a device, entity, and/or virtual object including a processing circuit 318, a storage device 320 to store a plurality of puzzles associated with the token 302, and a high-bandwidth, secure communication interface 322.

When the user attempts to use the token 302 to authenticate him/herself with a verifier 304, the token sends an authentication request (with the Token ID) to the verifier 304. The verifier 304 and helper 306 may be coupled to a high bandwidth network (e.g., internet, private network, etc.) through which they can communicate and/or exchange data. The verifier 304 requests a plurality of puzzles (associated with the Token ID) from the helper 306. The helper 306 responds by sending a pseudorandomly selected set of puzzles (associated with the Token ID received) to the verifier 304. In some implementations, the helper 306 and verifier 304 may communicate across an open internet using a well-known security protocol, such as the Transport Layer Security (TLS) protocol or security Internet Protocol (IPsec) to secure their interaction.

The verifier 304 then selects one or more of the received puzzles and decrypts or cracks it by a brute force attack. Upon decrypting or cracking the puzzle, the verifier obtains a puzzle secret (PS) and a puzzle ID (PID) from the puzzle. A verifier key (VKv) is generated by the verifier 304 based on the puzzle secret (PS). The verifier 304 sends the puzzle ID (PID) and a Message Authentication Code (MAC) of the verifier key (VKv) to the token 302. The token 302 uses the received PID and its pre-stored secret key (SK) and puzzle generation algorithm to obtain the puzzle secret for the PID. The token 302 can then use the puzzle secret to regenerate its own local verifier key (VKt). The verifier keys should match (VKt=VKv), which allows the verifier key VK to be used as a symmetric key for authentication between the token 302 and the verifier 304. The token 302 may store the verifier key (VK) for future authentication with the verifier 304.

Note that in some implementations, the verifier 304 may break, crack, or decrypt a plurality of puzzles to obtain a plurality of puzzle secrets and puzzle identifiers. The verifier key (VKv) may be generated based on the plurality of puzzle secrets, thereby gaining additional strength. The corresponding puzzle identifiers are sent to the token 302 which can then use them to generate its local verifier key (VKt).

Figure 4:
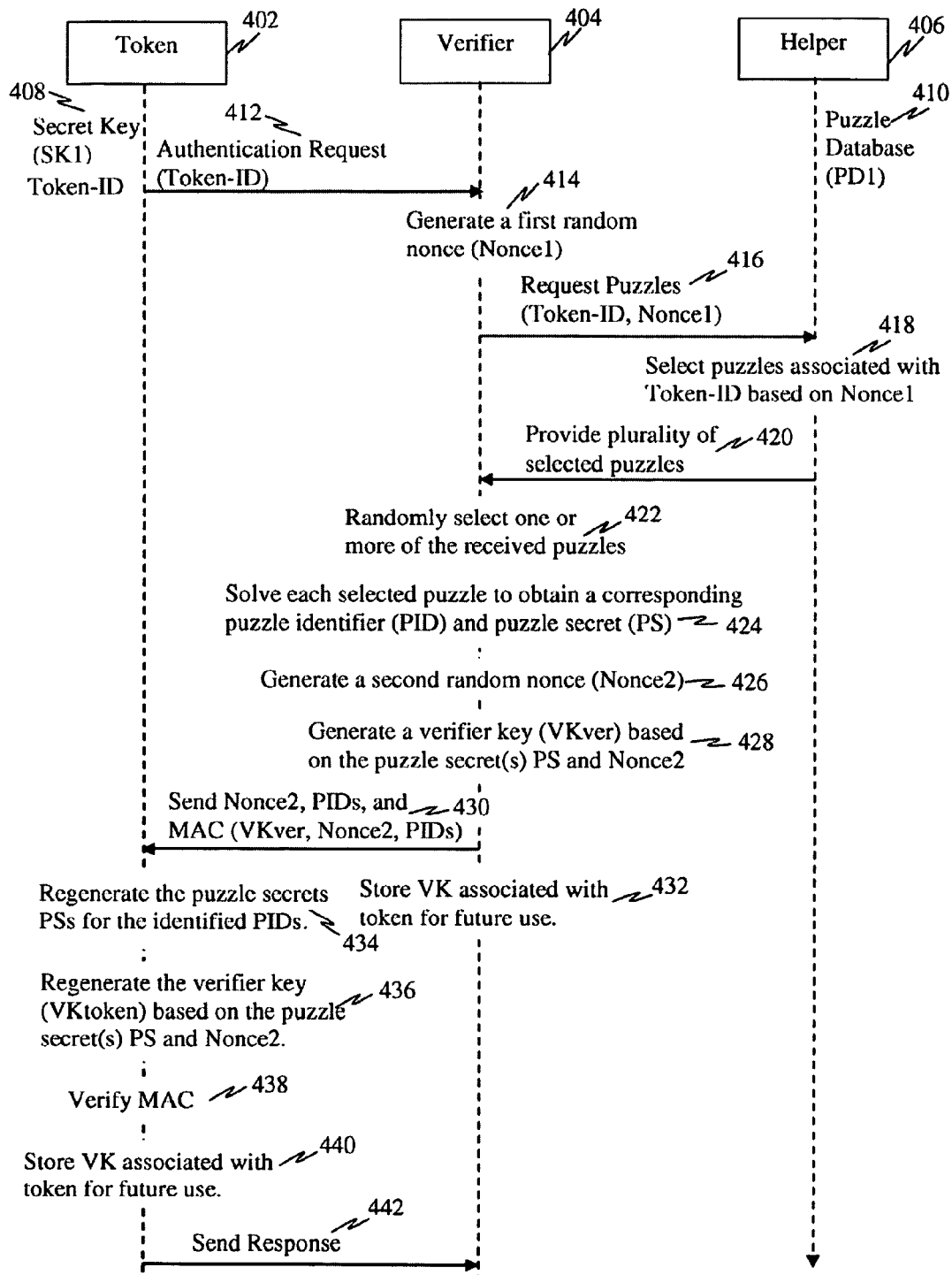
FIG. 4 illustrates a method for initial authentication between a token and verifier with the assistance of a helper.

FIG. 4 illustrates a method for initial authentication between a token and verifier with the assistance of a helper. A token 402 is provisioned with a secret key (SK1). When a user wishes to perform a secured transaction involving authentication, it may use the token 402 to initiate an authentication with a verifier 404 by sending an authentication request 412 along with the token identifier (Token ID). An authentication helper 406 may be identified by the token 402 (or user of the token) or be identified as a default. For example, either the token 402 or user may provide the verifier 404 with contact information for the helper 406 where the puzzles for the token are stored.

The verifier 404 may establish a secure and/or authenticated connection with the helper 406. The verifier 404 may also generate a first random nonce (Nonce1) 414. The Token-ID and Nonce1 are then sent to the helper 406.

The helper 406, which has been previously provisioned with the puzzle database 410 for the token 402, uses the Token-ID to select puzzles from the puzzle database 410. In one implementation, the helper 406 may use the first nonce (Nonce1) to select a pseudorandom selection (set) of the N puzzles 418 associated with the token 402 (where N is an integer between 2 and several million) and returns them to the verifier 420. If Nonce1 was provided by the verifier 404, the helper 406 may provide proof that the set of puzzles were selected under the influence of the received Nonce1. The connection between the verifier 404 and 406 may then be closed or terminated.

The verifier 404 selects one or more of the received puzzles 422. In some implementations, a random sequence of t puzzles is selected, where t>=1 and t is a subset of all puzzles received. The more puzzles that are used, the more security is gained if the helper 406 was compromised, as the helper 406 and attacker have no idea which t puzzles will be used or in what order (sequence) they are combined to generate a verifier key.

Where the selected puzzles are encrypted, they may be solved (decrypted or cracked) by the verifier 404 (e.g., using a brute force attack technique) to obtain a puzzle identifier (PID) and puzzle secret (PS) for each of the selected puzzles 424.

The verifier 404 calculates a verifier key (VKver) 428 based on puzzle secret (PS) and, possibly, a second pseudorandom nonce (Nonce2) 426. For example, a hash function H (e.g., secure hash algorithm SHA-256, etc.) may be used to generate the verifier key VKver=H(Nonce2, PS). In some implementations, a plurality of puzzles are used for extra security such that the puzzle secrets $PS_1, PS_2, \ldots, PS_t$ are combined into the verifier key VKver=H(Nonce2, $PS_1, \ldots, PS_t$). The verifier 406 sends a message to the token 402, where the message may include the second nonce (Nonce2) and an ordered list of t PIDs 430. The verifier 404 may also send a message authentication code (MAC) which takes as inputs the secret verifier key (VKver) and the message, and outputs a tag MAC(VKver, Nonce2, PID) 430. The verifier 404 may also store the verifier VKver associated with this user for use in subsequent authentications 432.

Upon receiving the PIDs and MAC from the verifier 404, the token 402 regenerates the puzzle secrets PSs of the solved puzzles based on the received PIDs 434. For instance, the token 402 may use its secret key (SK1) and puzzle-generation algorithms to obtain the puzzle secret PS for and identified PID. The token 402 then generates a local verifier key VKtoken based on the puzzle secrets PSs and the second nonce (Nonce2) 436. It verifies the received message authentication code MAC(VKver, Nonce2, PIDs) against the local MAC (VKtoken, Nonce2, PIDs) 438. An error is indicated if the MACs are not equal, indicating tampering (or accidental corruption) of the received MAC(VKver, Nonce2, PIDs) and/or content of the message. The token 402 also checks that it does not already have the same verifier key VK stored, to prevent replay attacks. Assuming success, the token 402 stores VK in a free slot 440. That is, the token 402 may organize the verifier keys (for different applications or verifiers) in slots. The user may make note of the slot number, or assign a name to the slot, associated with the verifier key VK for later selection or display.

The token 402 generates its authentication response (much as in the subsequent authentication stage described below) and sends it to the verifier 442. The verifier 404 receives the response, which should be correct, and marks the account as ready to use.

Subsequent Authentication Stage

Once a verifier key (VK) has been set up between a token and a particular verifier, that verifier key (VK) may be used in subsequent authentication requests between them. The verifier key (VK) is kept secret or secured between the token and verifier. It may be used as a symmetric key in a challenge-response authentication process between the token and verifier. In some implementations, the verifier key (VK) may also be used for privacy of communications to encrypt messages between two devices.

Figure 5:
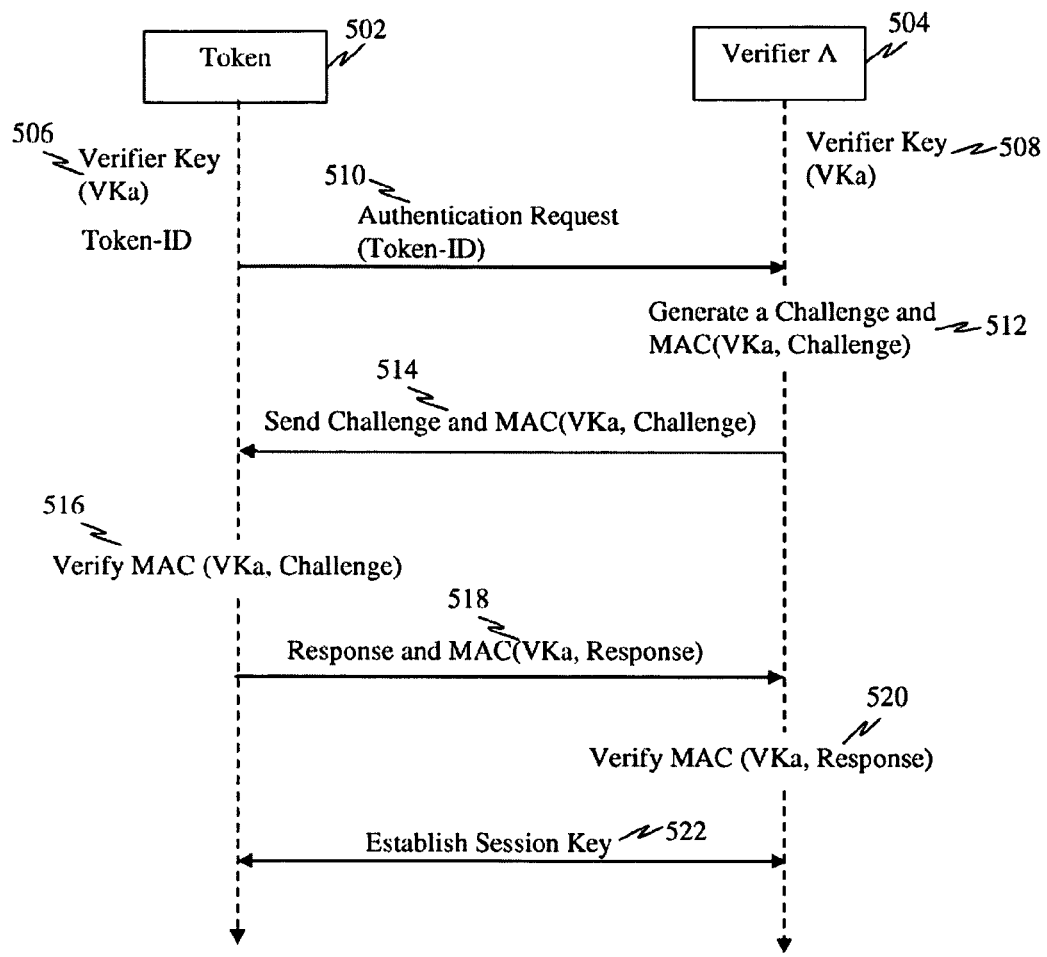
FIG. 5 illustrates a method for performing subsequent authentication between a token and verifier.

FIG. 5 illustrates a method for performing subsequent authentication between a token and verifier. A secured verifier key VKa 506 and 508 may have been previously established between the token 502 and verifier 504. This verifier key VKa may be specific to the relationship between token 502 and verifier 504 and is not applicable to other verifiers. The token 502 sends an authentication request with its Token-ID 510 to the verifier 504 (this may be implicit, for example, a customer asking a bank teller to perform a transaction). The verifier 504 uses the Token-ID to identify the previously established verifier key VKa 508 for the token 502. The verifier 504 generates a Challenge and a MAC (VKa, Challenge) 512. The Challenge may be an arbitrary or pseudorandom number, string and/or sequence of bits or symbols. The Challenge and MAC (VKa, Challenge) are then sent to the token 514. Using the received Challenge, and its previously stored verifier key VKa 506, the token 502 may verify the MAC(VKa, Challenge) 516. That is, the token 502 verifies whether the received MAC(VKa, Challenge) is the same as the locally calculated MAC(VKa, Challenge).

In one implementation, the token 502 may have knowledge of which verifier it is sending the authentication request 510. For example, the user may identify the verifier key VKa 506

(associated with a particular verifier) to be used by the token 502. In such implementation, when verifying the received MAC(VKa, Challenge), the token 502 simply uses the verifier key VKa 506 that it has been told to use.

In other implementations, the token 502 may not know with which verifier it is communicating. In such cases, the token may simply attempt to verify the received MAC(VKa, Challenge) against each of its stored verifier keys. If one of the stored verifier keys generates the same MAC, then it is assumed to be the correct verifier key.

Once the verifier key VKa has been authenticated, the token 502 sends a Response and MAC(VKa, Response) 518 to the verifier 504. The Response may be an arbitrary or pseudorandom number, string and/or sequence of bits or symbols. The Challenge and Response are selected to be distinct from each other so that the messages between the token and verifier are not identical. Generally, for security, the response may be related to the challenge originally issued, but not identical. For example, the response could be a string that is one greater than a received challenge string; in such a case the response itself need not be transmitted. The received MAC (VKa, Response) may be verified by the verifier 504 by using its known verifier key VKa 508 and the received Response 520. If the receive MAC matches the local MAC calculated by the verifier 504, then authentication is complete. A Session Key may then be established 522, either by the token 502, the verifier 504, or both.

In order to prevent a replay attack, where an eavesdropper attempts to reuse a previously used session key, the token may implement security mechanisms. For example, various tokens may implement a sequence counter or timestamps to prove authentication. The counters or timestamps change in a way that only parties that know the verifier key VK can predict. Thus, eavesdroppers who has obtained a previous MAC response from the token or a session key is not able to reuse it.

Authentication With Sequence Counter

Figure 6:
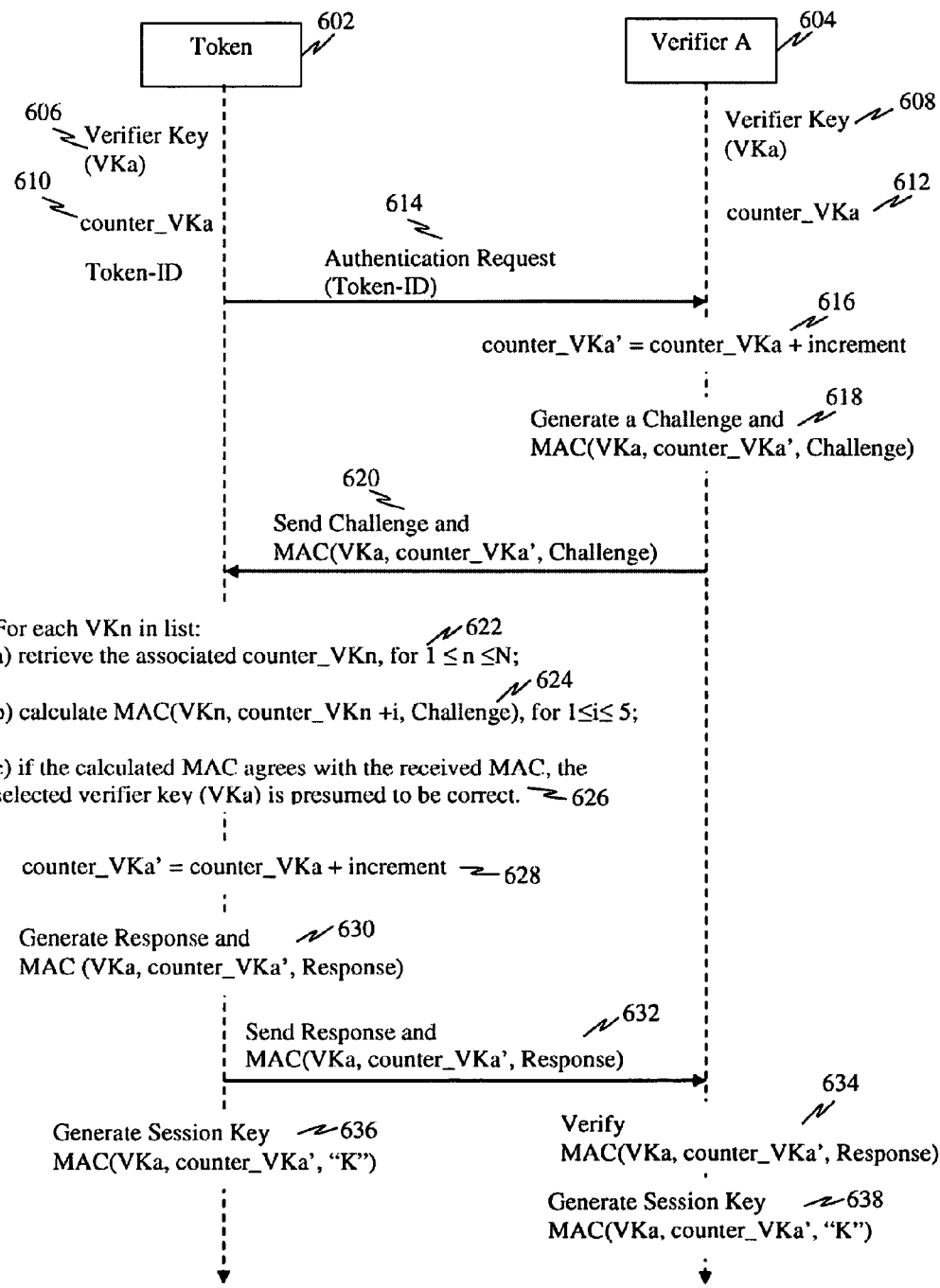
FIG. 6 illustrates a method for performing authentication between a token and verifier using a counter.

FIG. 6 illustrates a method for performing authentication between a token and verifier using a counter. A verifier key VKa 606 and 608 and an associated sequential counter counter_VKa 610 and 612 are provisioned on both the token 602 and verifier 604. The verifier key VKa 606 and 608 and sequential counter counter_VKa 610 and 612 may have been previously arranged and/or synchronized between the token 602 and verifier 604. For example, when the verifier key VKa is first established between the token 602 and verifier 604, the token 602 and verifier 604 may synchronize their counters 610 and 612. The counters 610 and 612 are used as a security measure in case an unauthorized party attempts to pose as the token 602 and/or verifier 604. Counter_VKa 610 (at the token 602) and 612 (at the verifier 604) is used as a security measure in case an unauthorized party attempts to pose as the token 602 and/or verifier 604.

The token initiates a transaction by sending an authentication request with its Token-ID 614. Upon receiving the authentication request, the verifier 604 uses the Token-ID to identify the verifier key VKa 608 associated with the token 602. It then selects the counter_VKa 612 corresponding to the verifier key VKa 608. Counter_VKa is incremented at the verifier 604 by a fixed increment 616 to obtain counter_VKa'. A Challenge is generated and a message authentication code of the verifier key VKa, counter_VKa', and Challenge (MAC (VKa, counter_VKa', Challenge)) 618. This Challenge and MAC(VKa, counter_VKa', Challenge) are sent from the verifier to the token 620. For each verifier key VKn stored by the token 602, a) the associated counter_VKn is retrieved (where $1 \leq n \leq N$, and N is the total number of verifier keys stored by the token) 622, b) then a MAC(VKn, counter_VKn+i, Challenge) is calculated for each verifier key VKn and counter_VKn (where $1 \leq i \leq 5$ for example), c) if the calculated MAC agrees with the received MAC, the selected verifier key (i.e., VKa) is presumed to be correct. In some implementations, the Challenge may be a known number, string, or sequence of bits so the MACs for each verifier key VKn may be pre-calculated and stored for faster response.

Once the correct verifier key VKa is found, the token 602 updates its counter_VKa'=counter_VKa+increment 628. Thus, both the token 602 and verifier 604 maintained synchronized counters. The token then calculates a Response and a MAC(VKa, counter_VKa', Response) 630 and sends it to the verifier 632.

The verifier 604 verifies the received MAC(VKa, counter_VKa', Response) using its own VKa and counter_VKa' as well as the received Response. If the received MAC is successfully verified, the token 602 is considered authenticated. Both the token 602 and verifier 604 may calculate a session key=MAC(VK, counter_VKa', "K") 636 and 638, where "K" may be a secret key or a pre-arranged value known or determinable by both the token 602 and verifier 604.

Note that if the token 602 receives a random challenge from an attacker, it will not be able to find the corresponding verifier key VK, which indicates an error, and authentication fails.

Authentication with Timestamps

Figure 7:
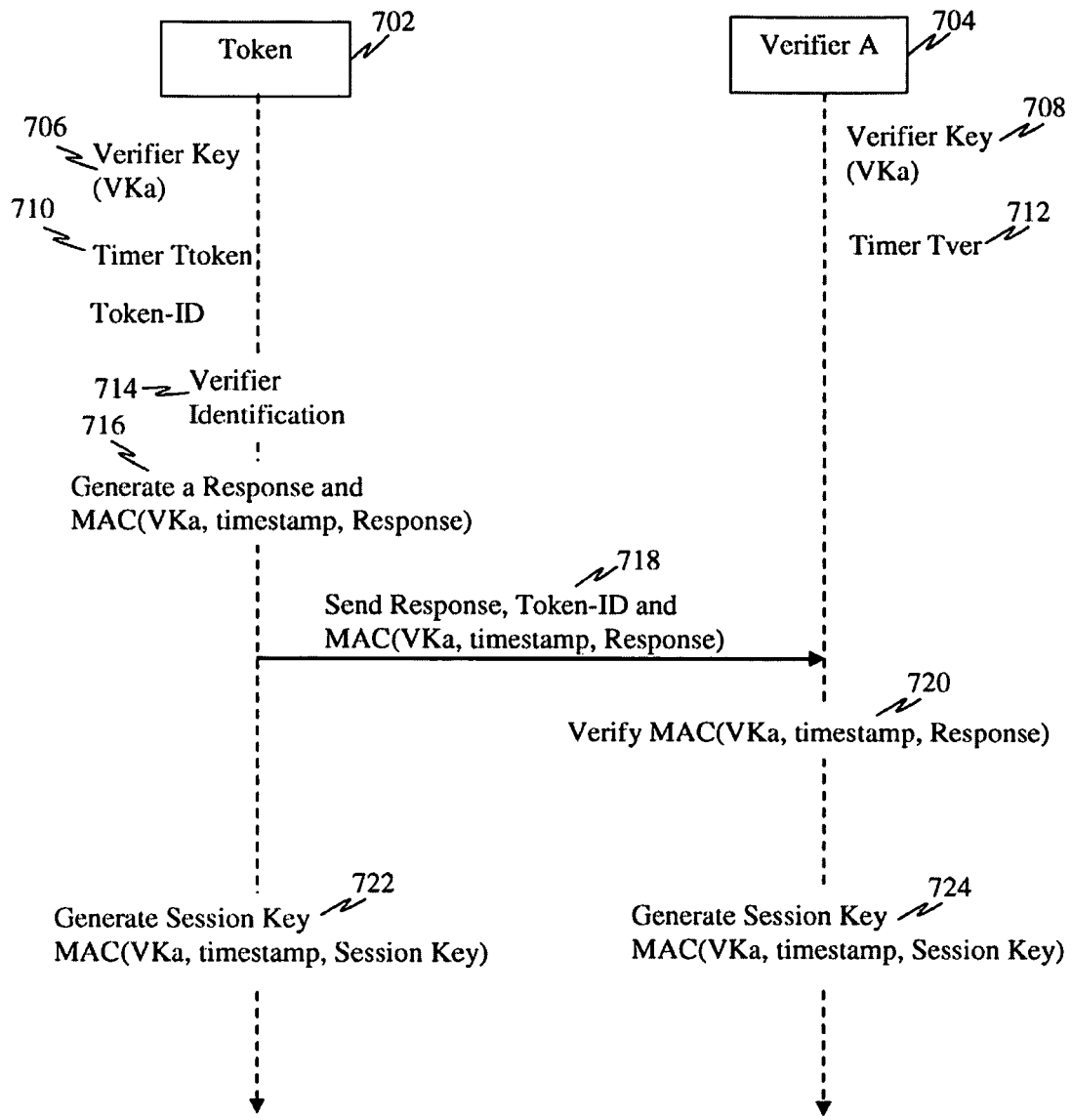
FIG. 7 illustrates a method for performing authentication between a token and verifier using a timer.

FIG. 7 illustrates a method for performing authentication between a token and verifier using a timer. This method simplifies the authentication protocol by having the user identify the verifier to the token, thereby avoiding the need for a challenge from the verifier 704 (with which to identify the verifier). This feature may also be implemented in other protocols (such as the counter-based authentication protocol described above) to reduce the number of authentication steps. This method assumes that the token 702 and verifier 704 can maintain synchronized timers Ttoken 710 and Tver 712 (e.g., coordinated universal time UTC) with reasonable accuracy. For example, the token 702 may have a Timer Ttoken 710 synchronized or initialized during provisioning. The verifier 704 may have a network connection through which its Timer Tver 712 is synchronized and/or maintained. The token 702 may receive an indication (from the user or otherwise) that identifies the verifier 704 with which token is being authenticated 714. For example, the user may select a particular name or verifier key VKa 706 that was previously associated with a particular verifier 704. In this manner, the token 702 may obtain the appropriate obtains verifier key VKa 706 previously associated with the verifier 704. The token generates a Response and MAC(VKa, timestamp, Response) 716 and sends it to the verifier 718. The timestamp used in the Response is obtained from the Timer Ttoken 710. The Response, MAC(VKa, timestamp, Response), and a Token-ID are sent to the verifier 718 for authentication of the token.

The verifier verifies the received MAC(VK, timestamp, Response) 720 by retrieving the verifier key VKa 708 (corresponding to the Token-ID) 708 and using the Timer Tver 712 (to obtain a timestamp) and the received Response to compute a local version of the MAC. The resolution of the timestamp may be adjusted to accommodate small variations between the timers Ttoken 710 and Tver 712 or delays between the time the MAC is generated by the token 702 and the time it is provided to the verifier 702. For example, the timestamp may have a resolution of +/−30 seconds or some other time window.

In some implementations, the token 702 and/or verifier 704 may calculate MAC(VK, timestamp, Session Key) 722 and 724 for use as a session key during a particular transaction, where the Session Key is a pseudorandom or arbitrary number, string, and/or sequence of bits known or determinable by both the token 702 and verifier 704.

Note that by not receiving a challenge from the verifier 704, the token does not know whether the verifier is genuine. Thus, it may rely on the user presenting the token to a trusted verifier. If additional security is desired, this token 702 may request a challenge from the verifier 704 with which it can ascertain whether the verifier is valid or genuine (e.g., that the verifier knows the verifier key VKa).

Usage Scenarios

In single-factor authentication systems, a user may use a token to authenticate him/herself with the verifier. That is, mere possession of the token having the correct verifier keys is sufficient to authenticate the user. However, single-factor authentication has the disadvantage that anyone who gains access to the physical token may gain unauthorized access to the accounts and/or information guarded by the verifier.

In two-factor authentication systems, two security measures are used to achieve greater security. One such factor may be a secure password, key, identifier, photo identification, fingerprint, voice sample, etc., that the user provides at the point of authentication. The second factor may be a token storing the correct verifier key(s) that is also presented at the point of authentication.

The authentication protocol between a token and verifier described herein may be performed either manually, automatically, or a combination thereof. In some examples, the user may act as a go-between for the token and verifier. For instance, the challenges and responses (e.g., MACs) may be relatively short strings of digits, letters and/or symbols that a user is able to manually enter into the token and/or verifier. In other examples, the token may be coupled directly to a verifier by an interface (e.g., wireless, universal serial bus, sound, etc.), thereby exchanging authentication messages via the interface etc.). In implementations where token and verifier communicate directly with each other, the authentication protocol may use longer challenges and responses, more puzzles, and so on, for added security.

Example of a Token

Figure 8:
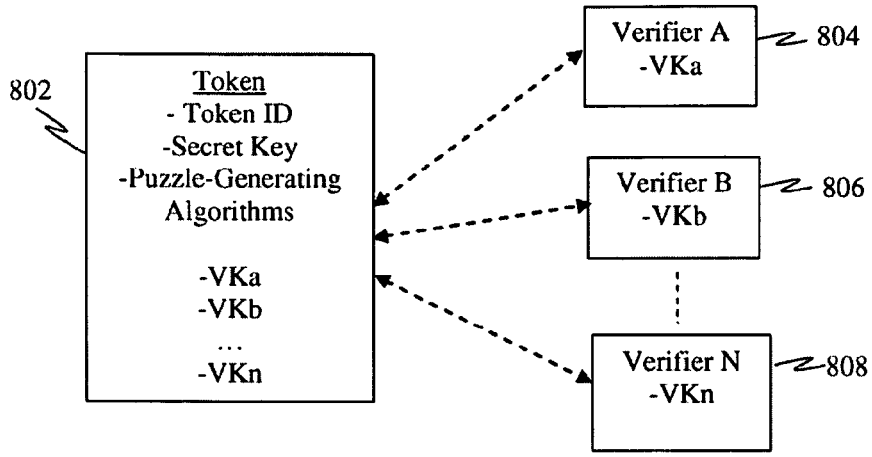
FIG. 8 is a block diagram illustrating how a token may store multiple verifier keys to authenticate with a plurality of different verifiers.

FIG. 8 is a block diagram illustrating how a token 802 may store multiple verifier keys to authenticate with a plurality of different verifiers 804, 806, and 808. The token 802 may have limited processing resources and a limited-bandwidth communication interface, and may be configured to operate as illustrated in FIGS. 1-7. Some prior art tokens may store a plurality of public keys for authentication with different verifiers but demand significant processing resources and communication bandwidth to implement such public-key authentication system. Other tokens may store a symmetric key that, due to security considerations, can be utilized with just one verifier. By contrast to such prior art tokens, the present token 802 is configured to obtain and securely store a plurality of symmetric keys while utilizing limited processing resources and a limited-bandwidth interface. That is, the token 802 may obtain a plurality of verifier keys (i.e., symmetric keys) in the manner illustrated in FIG. 1-7, allowing it to be authenticated with multiple different verifiers. Particularly, the verifier keys are generated securely by the token 802 and verifiers 804, 806, 808 and are not sent or transmitted between the token 802 and verifiers 804, 806, 808. Additional verifier keys (i.e., symmetric keys) may be added to the token after initial deployment in a secure manner.

Figure 9:
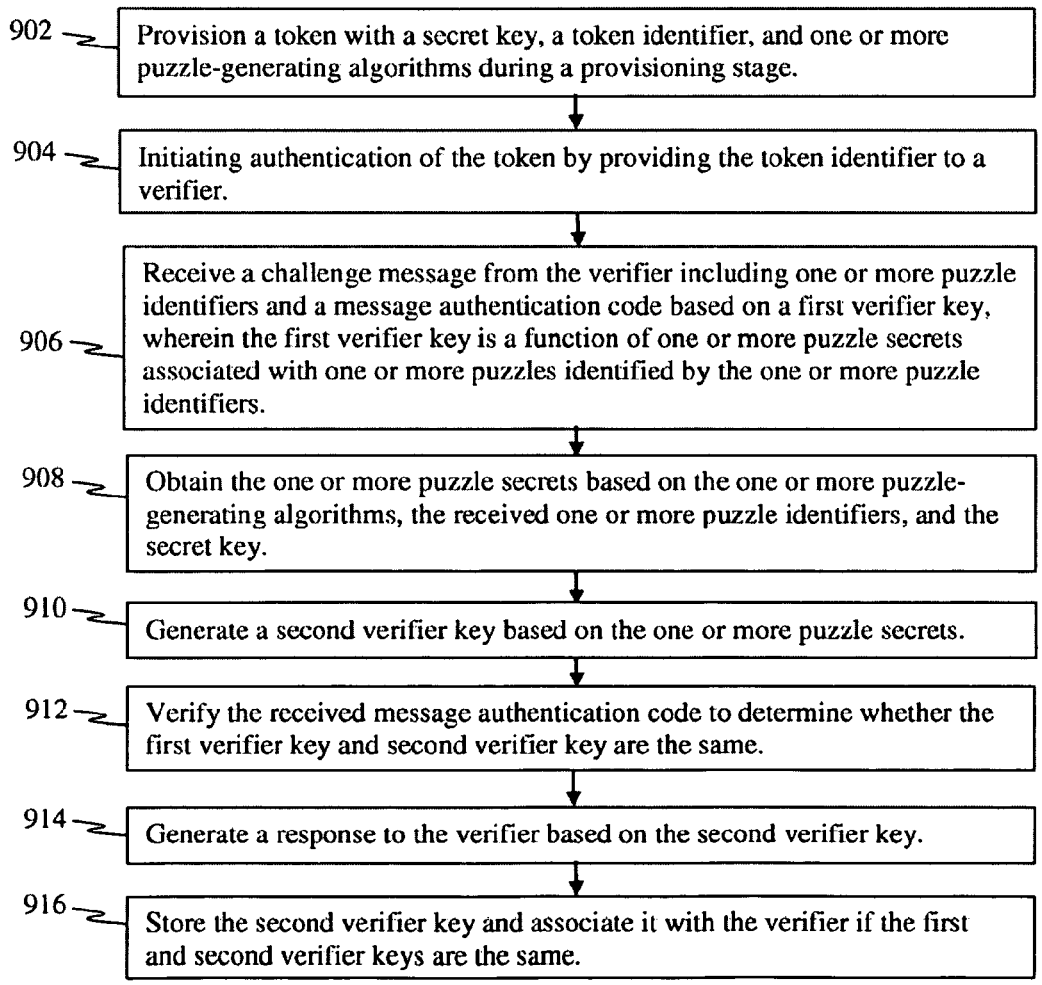
FIG. 9 illustrates a method operational on a token to perform secured authentication using symmetric keys with a plurality of different verifiers.

FIG. 9 illustrates a method operational on a token to perform secured authentication using symmetric keys with a plurality of different verifiers. The token is provisioned with a secret key, a token identifier, and one or more puzzle-generating algorithms during a provisioning stage 902. The token may initiate authentication with a verifier by providing its token identifier to a verifier (initial authentication stage) 904. The user or token may provide a helper address to the verifier for a helper that stores a plurality of puzzles associated with the token.

A challenge message is received from the verifier including one or more puzzle identifiers and a message authentication code based on a first verifier key, wherein the first verifier key is a function of one or more puzzle secrets associated with one or more puzzles identified by the one or more puzzle identifiers 906. The token (independently) obtains the one or more puzzle secrets based on the one or more puzzle-generating algorithms, the received one or more puzzle identifier(s), and the secret key 908. For example, the token may use the secret key and/or the one or more token identifiers as inputs to the puzzle-generating algorithms to generate the one or more puzzles and/or one or more puzzle secrets corresponding to the token identifier. A second verifier key is generated by the token based on the one or more puzzle secret(s) 910. The received message authentication code is verified by the token to determine whether the first verifier key and second verifier key are the same 912. The token generates a response to the verifier based on the second verifier key 914. If the message authentication code is successfully verified, the second verifier key is stored by the token and associated with the verifier 916. The first and second verifier keys are used as a symmetric key for subsequent authentication between the token and verifier. In a similar manner, the token may setup different symmetric keys with other verifiers. Thus, a single token may be used to store multiple verifier keys (i.e., symmetric keys) used with different verifiers. The token may establish additional verifier keys for distinct verifiers as needed without compromising the security of other verifier keys.

Example of a Verifier

Figure 10:
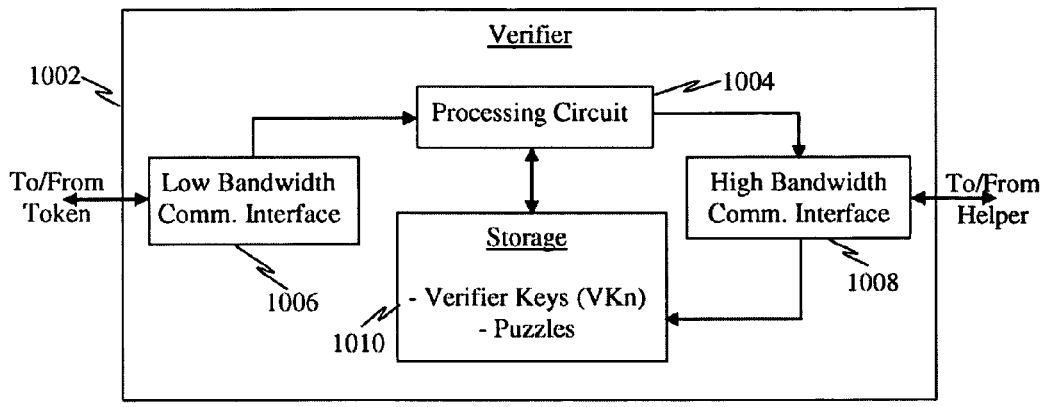
FIG. 10 is a block diagram illustrating a verifier configured to establish a symmetric key with the assistance of a helper to authenticate a token.

FIG. 10 is a block diagram illustrating a verifier 1002 configured to establish a symmetric key with the assistance of a helper to authenticate a token. The verifier 1002 may include a processing circuit 1004 with significant processing capabilities, a low bandwidth communication interface 1006 (e.g., a keypad, wireless transponder, etc.) to communicate with tokens, a high bandwidth communication interface 1008 to communicate with a helper, and a storage device 1010 to store puzzles received from the helper and verifier keys associated with tokens. The verifier 1002 may be configured to operate as illustrated in FIGS. 1-7. The processing circuit 1004 is configured to receive a token identifier from a token via the low bandwidth communication interface 1006 and request a plurality of puzzles from a helper via the high bandwidth communication interface 1008. The contact information for the helper may be provided by the token, the user of the token, or a default location (e.g., internet address, Uniform Resource Locator (URL), etc.). The processing circuit 1004 then randomly selects one of the received puzzles and breaks it or decodes it by a brute force attack. In such brute force attack, the processing circuit 1004 may try various possible keys until one is found that successfully decrypts or decodes the puzzle. The length of the key (e.g., 32 bits, 64 bits, 128 bits, etc.) with which the puzzles are encrypted may be known to the verifier 1002, thereby limiting the search for a key.

Figure 11:
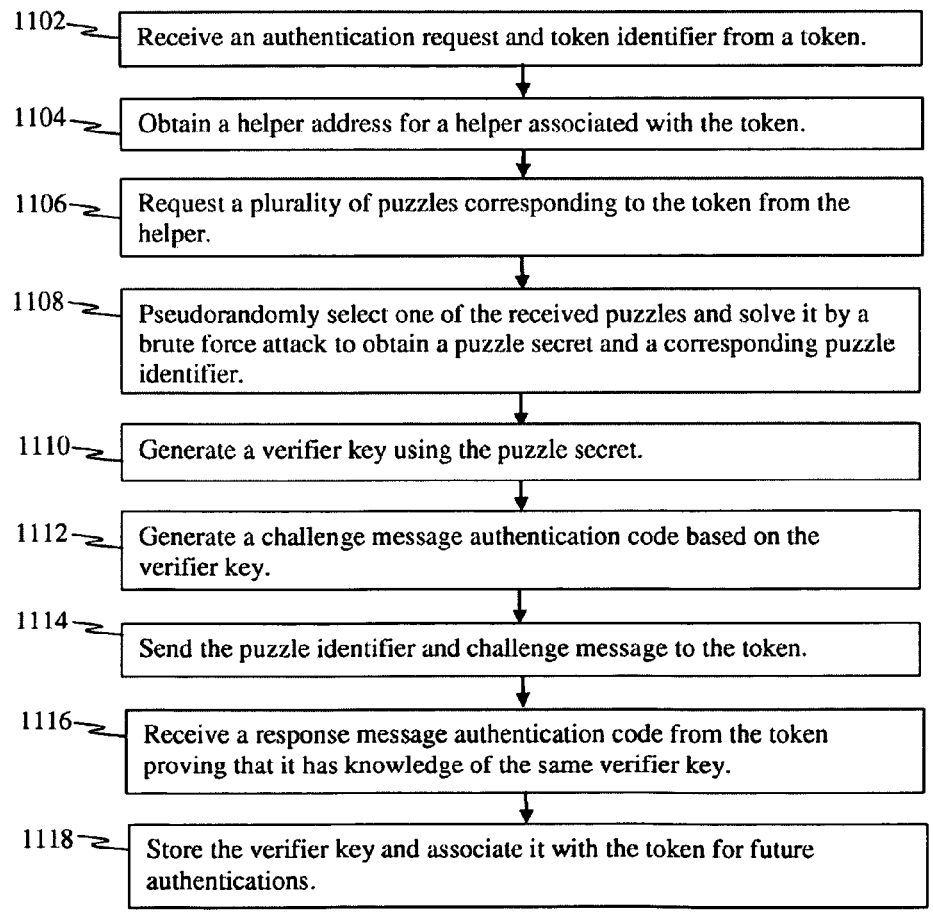
FIG. 11 illustrates a method operational on a verifier that performs secured authentication of a token with the assistance of a helper.

FIG. 11 illustrates a method operational on a verifier that performs secured authentication of a token with the assistance of a helper. An authentication request is received from a token (via a low-bandwidth interface) along with a token identifier 1102. A helper address for a helper associated with the token is obtained by the verifier 1004. The verifier then requests a plurality of puzzles (e.g., thousands, hundreds of thousands, or millions) corresponding to the token from the helper 1106. In some implementations, the verifier may also send a first pseudorandom nonce to the helper so that the plurality of puzzles is selected pseudorandomly and without biasing by the helper. The verifier then pseudorandomly selects one of the received puzzles and solves it by a brute force attack to obtain a puzzle secret and a corresponding puzzle identifier 1108. For example, if the verifier knows the length of a key with which the puzzle is encoded, it can try all possible keys until the puzzle is solved (e.g., a message is successfully decoded). The verifier then generates a verifier key using the puzzle secret 1110. A challenge message authentication code is generated by the verifier based on the verifier key 1112. The puzzle identifier and challenge message are sent to the token 1114. A response message authentication code may be received from the token proving that it has knowledge of the same verifier key 1116. The verifier key is stored by the verifier and associated with the token for future authentications 1118.

In some implementations, additional security may be provided by using a plurality of puzzles (instead of just one) to generate the verifier key. The verifier may pseudorandomly select and break plurality of puzzles, thereby obtaining a plurality of puzzle secrets. The plurality of puzzle secrets may then be combined to generate the verifier key.

Example of a Helper

Figure 12:
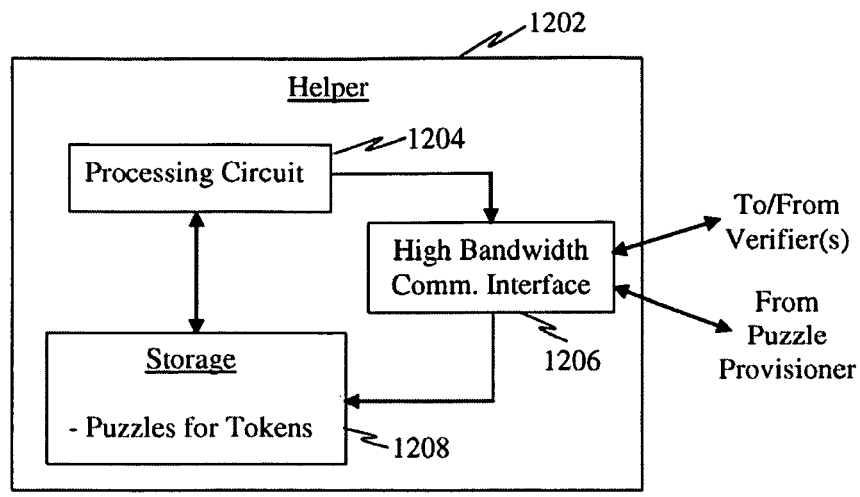
FIG. 12 is a block diagram illustrating a helper configured to assist a verifier in establishing a symmetric key for authenticating a token.

FIG. 12 is a block diagram illustrating a helper 1202 configured to assist a verifier in establishing a symmetric key for authenticating a token. The helper 1202 may be a networked device including a processing circuit 1204 coupled to a high bandwidth communication interface 1206 and a storage device 1208. The processing circuit 1204 is configured to receive a plurality of puzzles via its interface 1206 from a puzzle provisioner and store them in the storage device 1208. The puzzles are associated with a particular token identified by the puzzle provisioner. The processing circuit 1204 is also be configured to receive requests for puzzles from one or more verifiers via the interface 1206. The requests include a token identifier which the processing circuit 1204 uses to retrieve and send a plurality of the puzzles associated with the identified token. While the helper 1202 may assist the verifier in establishing a symmetric key with the token, due to the large number of puzzles and processing resources needed to break each token, it makes is prohibitive for it to determine the symmetric key.

Figure 13:
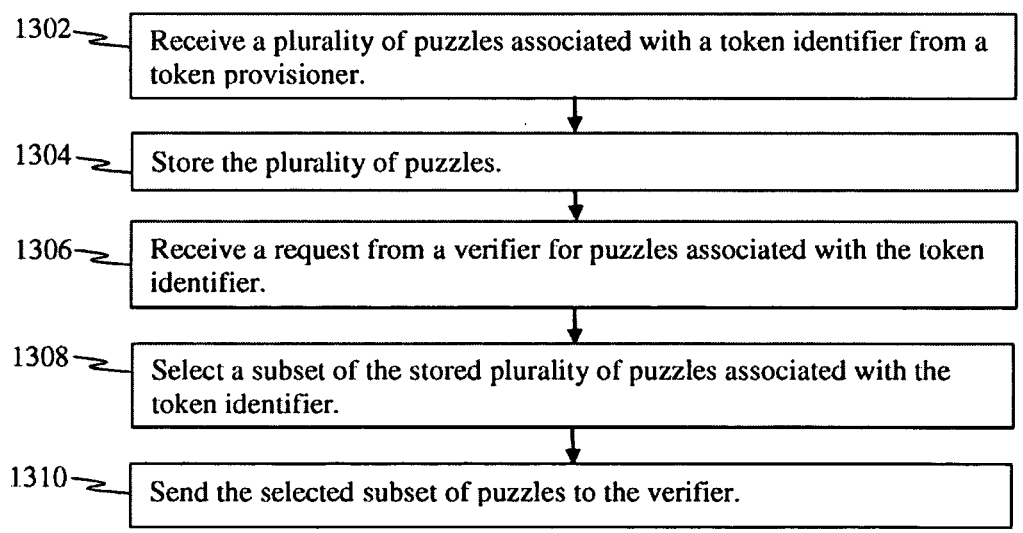
FIG. 13 illustrates a method operational on a helper to assist a verifier in authenticating a token.

FIG. 13 illustrates a method operational on a (network) helper to assist a verifier in authenticating a token. The helper may receive a plurality of (encoded or un-encoded) puzzles (e.g., thousands, hundreds of thousands, and/or millions) associated with a token identifier from a token provisioner 1302. The helper stores the plurality of puzzles 1304. The helper may receive a subsequent request from a verifier for puzzles associated with the token identifier 1306. This request may occur during an initial authentication stage between the verifier and the token in which a symmetric key (i.e., verifier key) is established between the verifier and the token. The helper (pseudorandomly) selects a subset of the stored plurality of puzzles associated with the token identifier 1308. The selected subset of puzzles is then sent to the verifier 1310. In some implementations, the helper may receive a nonce (e.g., a string of characters or number, etc.) from the requesting verifier which it uses to pseudorandomly select the plurality of puzzles sent to the verifier. The helper may also provide proof (e.g., message authentication code, etc.) that the nonce was utilized in selecting the plurality of puzzles. This prevents the helper from tampering with the selection of puzzles.

While the helper may assist the verifier in performing authentication of a token, it should not be able to pretend to be a verifier. If the helper is itself malicious, it may be able to spend time decrypting some of the puzzles, and ensure that it only ever delivers those ones to the verifier. However, such manipulation by the helper may be prevented by having the verifier send a pseudorandom nonce that the helper proves was used select the puzzles sent to the verifier. If the helper can also eavesdrop on the key establishment phase between a token and verifier it may also be able to ascertain the symmetric key established between them. However, successfully intercepting communications during the key establishment phase is not probable.

If the helper does not intercept the initial key establishment, but instead intercepts some subsequent authentications, it may obtain enough information to eventually discover the verifier key (symmetric key) established between a token and verifier. However, this would entail the helper solving all puzzles associated with a token, attempting different combinations of puzzle secrets (where the verifier key is based on a subset of ordered puzzle secrets), and discovering a nonce (not revealed to the helper) that may have been used in generating the verifier key. Thus, to attain greater securing, a verifier can request a larger set of puzzles from a helper and use a larger subset of them to establish its verifier key with a token.

One or more of the components, steps, and/or functions illustrated in FIGS. 1, 2, 3, 4, 5, 6, 7, 8, 9, 10, 11, 12 and/or 13 may be rearranged and/or combined into a single component, step, or function or embodied in several components, steps, or functions without affecting the authentication between the token and verifier. Additional elements, components, steps, and/or functions may also be added without departing from the invention. The apparatus, devices, and/or components illustrated in FIGS. 1, 3, 8, 10 and/or 12 may be configured to perform one or more of the methods, features, or steps described in FIGS. 2, 4, 5, 6, 7, 9, 11 and/or 13. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a verifier device for authenticating a token device, comprising:
   receiving, at the verifier device, an authentication request and token identifier from a token device;

obtaining a plurality of puzzles corresponding to the token identifier of the token device from a networked helper;

pseudorandomly selecting a subset plurality of the received puzzles and solving them to obtain one or more puzzle secrets and corresponding puzzle identifiers;

generating a verifier key based on the one or more puzzle secrets;

generating a challenge message based on the verifier key; and sending the puzzle identifiers, corresponding to the one or more puzzle secrets, and the challenge message from the verifier device to the token device.

2. The method of claim 1, further comprising:
receiving a response message from the token device proving that the token device has knowledge of the verifier key, wherein the verifier device authenticates the token device if the response message successfully proves that the token device knows the verifier key.

3. The method of claim 1, further comprising:
storing the verifier key; and
associating the verifier key with the token identifier for use as a symmetric key in subsequent authentications between the token device and the verifier device.

4. The method of claim 1, further comprising:
obtaining a helper address for the helper associated with the token device.

5. The method of claim 1, wherein a puzzle is an encoded message including a puzzle identifier and a puzzle secret.

6. The method of claim 1, further comprising:
synchronizing a local counter with a counter maintained by the token device to track each time authentication is performed between the token device and the verifier device, wherein subsequent authentication challenge messages are also based on a current counter value.

7. The method of claim 6, further comprising:
receiving a response message from the token device proving that the token device has knowledge of the verifier key and the current counter value, wherein the verifier device authenticates the token device if the response message successfully proves that it knows the verifier key and current counter value.

8. The method of claim 1, further comprising:
maintaining a timer to generate timestamps, wherein subsequent authentication challenge messages are also based on a current timestamp.

9. The method of claim 8, further comprising:
receiving a response message from the token device proving that the token device has knowledge of the verifier key and the current timestamp, wherein the verifier device authenticates the token device if the response message successfully proves that it knows the verifier key the current timestamp.

10. The method of claim 1, wherein solving the selected subset of puzzles includes performing a brute force attack to find one or more keys with which to decode the puzzles.

11. The method of claim 1, wherein the challenge message is a message authentication code.

12. The method of claim 1, further comprising:
generating a pseudorandom nonce; and
sending the pseudorandom nonce to the helper to be used in obtaining the plurality of puzzles from among a larger number of puzzles corresponding to the token device.

13. A verifier device for authenticating tokens, comprising:
a first communication interface having high bandwidth to a network;
a second communication interface having low bandwidth for communicating with tokens; and a processing circuit coupled to the first and second communication interfaces, the processing circuit configured to receive an authentication request and token identifier from a token over the second communication interface;
obtain a plurality of puzzles corresponding to the token identifier of the token from a helper over the first communication interface;
pseudorandomly selecting a subset plurality of the received puzzles and solving them to obtain one or more puzzle secrets and corresponding puzzle identifiers;
generate a verifier key based on the one or more puzzle secrets;
generate a challenge message based on the verifier key; and
send the puzzle identifiers, corresponding to the one or more puzzle secrets, and the challenge message from the verifier device to the token device via the second communication interface.

14. The verifier device of claim 13, wherein the processing circuit is further configured to
receive a response message from the token proving that the token has knowledge of the verifier key, wherein the verifier device authenticates the token if the response message successfully proves that the token knows the verifier key.

15. The verifier device of claim 13, further comprising:
a storage device coupled to the processing circuit for storing the verifier key;
wherein the processing circuit is further configured to associate the verifier key with the token identifier for use as a symmetric key in subsequent authentications between the token and the verifier.

16. The verifier device of claim 13, wherein the processing circuit is further configured to obtain a helper address for the helper associated with the token.

17. The verifier device of claim 13, wherein the processing circuit is further configured to
synchronize a local counter with a counter maintained by the token to track each time authentication is performed between the token and the verifier, wherein subsequent authentication challenge messages are also based on a current counter value; and
receive a response message from the token proving that the token has knowledge of the verifier key and the current counter value, wherein the verifier authenticates the token if the response message successfully proves that it independently knows the verifier key and current counter value.

18. The verifier device of claim 13, wherein the processing circuit is further configured to
maintain a timer to that generates timestamps, wherein subsequent authentication challenge messages are also based on a current timestamp; and
receive a response message from the token proving that the token has knowledge of the verifier key and the current timestamp, wherein the verifier authenticates the token if the response message successfully proves that it independently knows the verifier key and the current timestamp.

19. A verifier device for authenticating tokens, comprising:
means for receiving an authentication request and token identifier from a token;
means for obtaining a plurality of puzzles corresponding to the token identifier of the token from a networked helper;

means for pseudorandomly selecting a subset plurality of the received puzzles and solving them to obtain one or more puzzle secrets and corresponding puzzle identifiers;

means for generating a verifier key based on the one or more puzzle secrets;

means for generating a challenge message based on the verifier key; and means for sending the puzzle identifiers, corresponding to the one or more puzzle secrets, and the challenge message from the verifier device to the token device.

20. The verifier device of claim 19, further comprising:
means for receiving a response message from the token proving that the token has knowledge of the verifier key, wherein the verifier device authenticates the token if the response message successfully proves that the token knows the verifier key.

21. The verifier device of claim 19, further comprising:
means for storing the verifier key; and
means for associating the verifier key with the token identifier for use as a symmetric key in subsequent authentications between the token and the verifier device.

22. The verifier device of claim 19, further comprising:
means for obtaining a helper address for the helper associated with the token.

23. The verifier device of claim 19, further comprising:
means for synchronizing a local counter with a counter maintained by the token to track each time authentication is performed between the token and the verifier, wherein subsequent authentication challenge messages are also based on a current counter value; and
means for receiving a response message from the token proving that the token has knowledge of the verifier key and the current counter value, wherein the verifier authenticates the token if the response message successfully proves that the token knows the verifier key and current counter value.

24. The verifier device of claim 19, further comprising:
means for maintaining a timer to that generates timestamps, wherein subsequent authentication challenge messages are also based on a current timestamp; and
means for receiving a response message from the token proving that the token has knowledge of the verifier key and the current timestamp, wherein the verifier authenticates the token if the response message successfully proves that the token knows the verifier key the current timestamp.

25. A processing device, comprising:
a processing circuit configured to
receive an authentication request and token identifier from a token over a first communication interface;
obtain a plurality of puzzles corresponding to the token identifier of the token from a helper over a second communication interface;
pseudorandomly select a subset plurality of the received puzzles and solving them to obtain one or more puzzle secrets and corresponding puzzle identifiers;
generate a verifier key based on the one or more puzzle secrets;
generate a challenge message based on the verifier key; and
send the puzzle identifiers, corresponding to the one or more puzzle secrets, and the challenge message from the verifier device to the token device.

26. The processing device of claim 25 further comprising:
a storage device coupled to the processing circuit for storing the verifier key;

wherein the processing circuit is further configured to associate the verifier key with the token identifier for use as a symmetric key in subsequent authentications between the token and the verifier.

27. The processing device of claim 25, wherein the processing circuit is further configured to obtain a helper address for the helper associated with the token.

28. A non-transitory machine-readable medium having one or more instructions for authenticating a token to a verifier, which when executed by a processor causes the processor to:
obtain a plurality of puzzles by the verifier corresponding to the token from a networked helper;
pseudorandomly select a subset plurality of the received puzzles and solving them to obtain one or more puzzle secrets and corresponding puzzle identifiers;
generate a verifier key based on the one or more puzzle secrets;
generate a challenge message based on the verifier key; and
send the puzzle identifiers, corresponding to the one or more puzzle secrets, and the challenge message from the verifier device to the token device.

29. The non-transitory machine-readable medium of claim 28 having one or more instructions which when executed by a processor causes the processor to further: receive a response message from the token proving that the token has knowledge of the verifier key, wherein the verifier authenticates the token if the response message successfully proves that the token knows the verifier key.

30. The non-transitory machine-readable medium of claim 28, having one or more instructions which when executed by a processor causes the processor to further:
store the verifier key; and
associate the verifier key with the token identifier for use as a symmetric key in subsequent authentications between the token and the verifier.

31. A method operational on a token device for authenticating the token device to a verifier device, comprising:
provisioning the token device with a secret key, a token identifier, and one or more puzzle-generating algorithms;
initiating a request for authentication of the token device by providing the token identifier to a verifier device;
receiving a challenge message at the token device from the verifier device including one or more puzzle identifiers and a message authentication code based on a first verifier key, wherein the first verifier key is a function of one or more puzzle secrets associated with one or more puzzles identified by the one or more puzzle identifiers;
independently obtaining the one or more puzzle secrets based on the one or more puzzle generating algorithms, the received one or more puzzle identifiers, and the secret key;
generating a second verifier key based on the one or more puzzle secrets; and
verifying the received message authentication code to determine whether the first verifier key and second verifier key are the same.

32. The method of claim 31 further comprising:
storing the second verifier key and associating it with the verifier device if the first and second verifier keys are the same.

33. The method of claim 31 further comprising:
generating a response message to the verifier device based on the second verifier key indicating that the token device knows the first verifier key.

34. The method of claim 31 further comprising:
providing a helper address from the token device to the verifier device for a helper that stores a plurality of puzzles associated with the token device.

35. The method of claim 31 further comprising:
receiving a plurality of ordered puzzle identifiers from the verifier device, wherein the first verifier key is a function of a corresponding plurality of ordered puzzle secrets associated with the plurality of ordered puzzle identifiers; and
obtaining the plurality of ordered puzzle secrets based on the one or more puzzle-generating algorithms, the received puzzle identifiers, and the secret key, wherein the first and second verifier keys are also based on the plurality of ordered puzzle secrets.

36. The method of claim 31, further comprising:
synchronizing a local counter with a counter maintained by the verifier device to track each time authentication is performed between the token device and the verifier device, wherein subsequent received message authentication codes are also based on a current counter value.

37. The method of claim 36, further comprising:
sending a response message to the verifier device proving that the token device has knowledge of the verifier key and the current counter value.

38. The method of claim 31, further comprising:
maintaining a timer to generate timestamps, wherein subsequent received message authentication codes are also based on a current timestamp.

39. The method of claim 38, further comprising:
sending a response message to the verifier proving that the token device has knowledge of the verifier key and the current timestamp.

40. The method of claim 31, further comprising:
establishing a plurality of secure verifier keys with different verifier devices; and
storing the verifier keys and associating each of the verifier keys with a corresponding verifier for use as symmetric key authentications between the token device and the different verifier devices.

41. A token, comprising:
a first communication interface having low bandwidth for communicating with verifiers; and
a processing circuit coupled to the first communication interface, the processing circuit configured to
  receive a secret key, a token identifier, and one or more puzzle-generating algorithms;
  initiate a request for authentication of the token by providing the token identifier to a verifier;
  receive a challenge message from the verifier including a puzzle identifier and a message authentication code based on a first verifier key, wherein the first verifier key is a function of a first puzzle secret associated with a puzzle identified by the puzzle identifier;
  independently obtain the first puzzle secret based on the one or more puzzle-generating algorithms, the received puzzle identifier, and the secret key;
  generate a second verifier key based on the puzzle secret; and
  verify the received message authentication code to determine whether the first verifier key and second verifier key are the same.

42. The token of claim 41 further comprising:
a storage device coupled to the processing circuit and configured to store the second verifier key, wherein the processing circuit is configured to associate the second verifier key with the verifier if the first and second verifier keys are the same.

43. The token of claim 41, wherein the processing circuit is further configured to establish a plurality of secure verifier keys with different verifiers; and
  store the verifier keys and associate each of the verifier keys with a corresponding verifier for use as symmetric key authentications between the token and the different verifiers.

44. The token of claim 41, wherein the processing circuit is further configured to generate a response message to the verifier based on the second verifier key indicating that the token knows the first verifier key.

45. The token of claim 41, wherein the processing circuit is further configured to
  provide a helper address from the token to the verifier for a helper that stores a plurality of puzzles associated with the token.

46. A token for authenticating with verifiers, comprising:
means for provisioning a token with a secret key, a token identifier, and one or more puzzle-generating algorithms;
means for initiating a request for authentication of the token by providing the token identifier to a verifier;
means for receiving a challenge message from the verifier including a puzzle identifier and a message authentication code based on a first verifier key, wherein the first verifier key is a function of a first puzzle secret associated with a puzzle identified by the puzzle identifier;
means for independently obtaining the first puzzle secret based on the one or more puzzle-generating algorithms, the received puzzle identifier, and the secret key;
means for generating a second verifier key based on the puzzle secret; and
means for verifying the received message authentication code to determine whether the first verifier key and second verifier key are the same.

47. The token of claim 46 further comprising:
means for storing the second verifier key and associating it with the verifier if the first and second verifier keys are the same.

48. The token of claim 46 further comprising:
means for providing a helper address from the token to the verifier for a helper that stores a plurality of puzzles associated with the token.

49. A processing device, comprising:
a processing circuit configured to
  receive a secret key, a token identifier, and one or more puzzle-generating algorithms;
  initiate a request for authentication of the token by providing the token identifier to a verifier;
  receive a challenge message from the verifier including a puzzle identifier and a message authentication code based on a first verifier key, wherein the first verifier key is a function of a first puzzle secret associated with a puzzle identified by the puzzle identifier;
  independently obtain the first puzzle secret based on the one or more puzzle-generating algorithms, the received puzzle identifier, and the secret key;
  generate a second verifier key based on the puzzle secret; and
  verify the received message authentication code to determine whether the first verifier key and second verifier key are the same.

50. The processing device of claim 49, wherein the processing circuit is further configured to:

store the second verifier key and associate it with the verifier if the first and second verifier keys are the same.

51. The processing device of claim 49, wherein the processing circuit is further configured to:
generate a response message to the verifier based on the second verifier key indicating that the token knows the first verifier key.

52. A non-transitory machine-readable medium having one or more instructions for authenticating a token to a verifier, which when executed by a processor causes the processor to:
provision a token with a secret key, a token identifier, and one or more puzzle-generating algorithms;
initiate a request for authentication of the token by providing the token identifier to a verifier;
receive a challenge message from the verifier including a puzzle identifier and a message authentication code based on a first verifier key, wherein the first verifier key is a function of a first puzzle secret associated with a puzzle identified by the puzzle identifier;
independently obtain the first puzzle secret based on the one or more puzzle-generating algorithms, the received puzzle identifier, and the secret key;
generate a second verifier key based on the puzzle secret; and
verify the received message authentication code to determine whether the first verifier key and second verifier key are the same.

53. The non-transitory machine-readable medium of claim 52 having one or more instructions which when executed by a processor causes the processor to further: store the second verifier key and associate it with the verifier if the first and second verifier keys are the same.

54. The non-transitory machine-readable medium of claim 52 having one or more instructions which when executed by a processor causes the processor to further: provide a helper address from the token to the verifier for a helper that stores a plurality of puzzles associated with the token.

\* \* \* \* \*